Patented Nov. 8, 1938

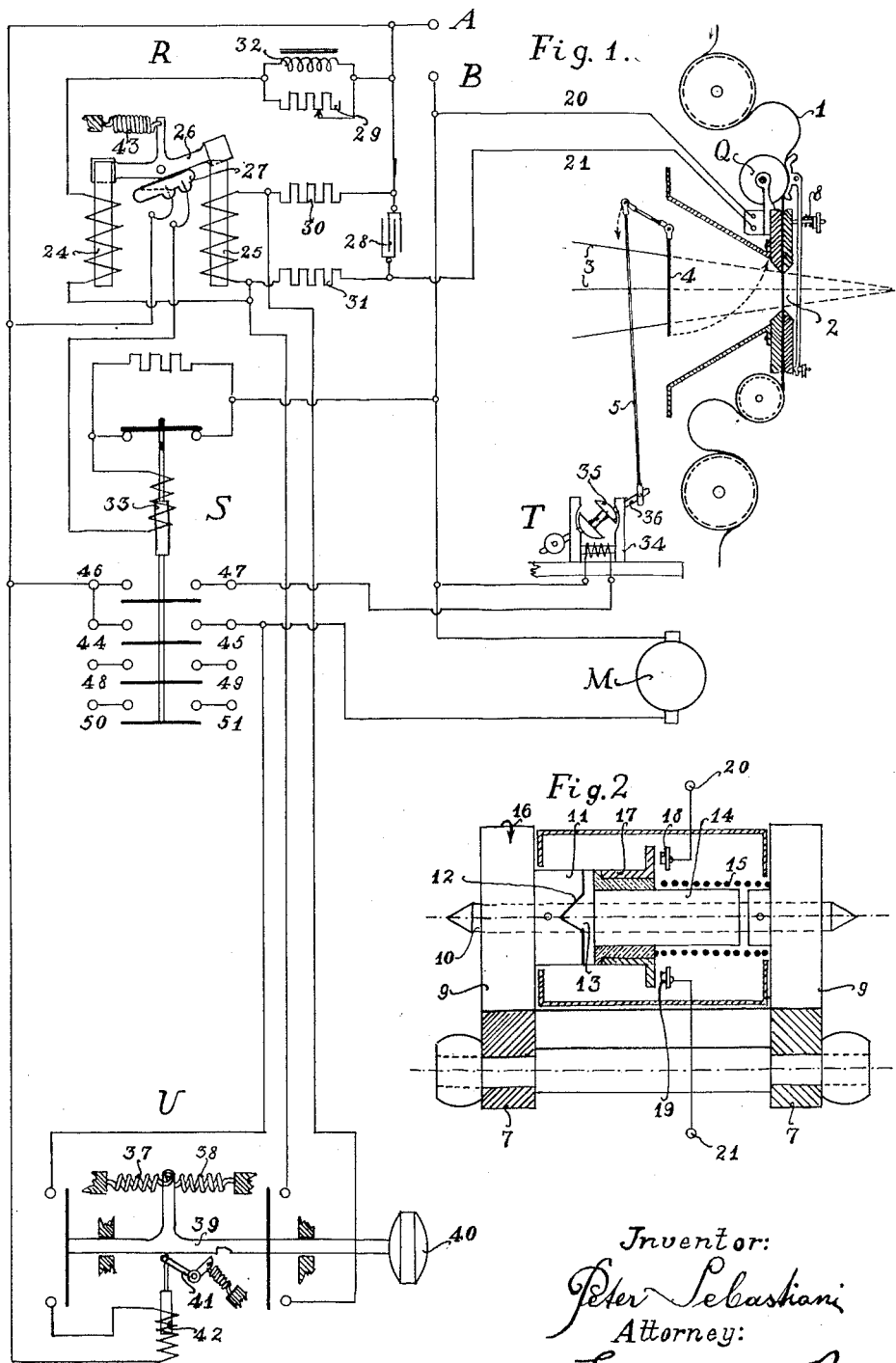

2,136,322

UNITED STATES PATENT OFFICE 2,136,322

FIRE PROTECTING DEVICE WITH FILM PROJECTORS IN CINEMAS

Peter Sebastiani, Ueberlingen, Bodensee, Germany

Application October 14, 1936, Serial No. 105,598
In Germany November 11, 1935

9 Claims. (Cl. 88—17)

My invention relates to film projecting apparatus especially in cinemas and has special reference to fire protecting devices for such apparatus.

The main object of my invention is to practically avoid every possibility of the film catching fire caused by the hot light rays coming from the lamp.

A further object is automatic disconnection of the entire projecting apparatus, and simplification in its handling.

There are still other objects which will occur to those skilled in the art when reading the following description.

With cinema projectors it is usual to provide a shutter adapted to interrupt the light rays coming from the lamp thus preventing them from falling on the film and creating by their heat a fire of the easily inflammable film. Such a shutter ought always to be closed whenever the film comes to a standstill or moves so slow that the light and heat rays could cause the film to catch fire.

There have many devices been designed and tried for an exact operation of such a shutter, but none of them answers to all possible failures which may occur. The known devices do not in all events cause the shutter to close, when the film moves too slow through or stands still in the projecting window because of the perforation of the film being defective or film breakage. Therefore they do not prevent fire in such cases.

That is why I designed and constructed a new device which operates in all events whenever the film moves so slow that it might catch fire. The device according to my invention is an electric one and will be understood best when having reference to the drawing which represents an example embodying my invention.

Figure 1 is a diagram showing most of the parts in symbols and disclosing their relation to each other.

Figure 2 represents the current interrupter Q of Fig. 1 in plan view and partly in section on an enlarged scale.

The film 1 passing downwards passes the projecting window 2 in which the light rays indicated at 3 fall on the film whenever the shutter 4 is in its open position, that is when rod 5 by downward movement has moved the shutter out of the path of the light rays.

It is well known that the film is moved jerkwise by means not represented here. Above the projecting window 2 a current interrupter Q is situated adapted to be rotated by friction from the film. For this purpose two slide brackets 7 by means of spring 8 press the film against two rollers 9 fixed to shaft 10. This shaft is in rigid connection with ring 11 having one or more indentations 12 corresponding to saw-like teeth 13 formed on part 14 loosely journalled on shaft 10. When the rollers 9 and the shaft 10 do not rotate spring 15 presses part 14 to the left so that it is in close touch with ring 11. But when rotating by jerks inclined side of indentation 12 pushes tooth 13 and part 14 to which it belongs to the right because loose part 14 does not follow the rotating movement immediately but is retarded. Thus with every jerk ring 17 which is insulated from part 14 but in fixed connection thereto causes electric connection between the contacts 18 and 19 and before the next jerk occurs this connection is again interrupted because of spring 15 pressing part 14 to the left again as soon as ring 11 looses in speed of rotation or comes to a standstill. Consequently, the current which flows through wires 20, 21 is interrupted in the same periodicity as the pictures follow on the film.

A and B represent the incoming clamps for the current which may be a direct current of 50 to 250 volts. If there be no direct current disposable a copper oxide rectifier would have to be inserted in the alternating current. Relay R comprises two U-shaped electromagnets 24 and 25 and a two-lever armature 26 to which a mercury contact tube 27 is connected, a condenser 28, three resistances 29, 30 and 31, and a choking coil 32. Resistance 29 is an adjustable resistance.

The mercury contact tube 27 controls the automatic circuit closing and breaking device S having a solenoid 33 and being adapted to connect a plurality of oppositely arranged contacts with one another.

The device T for operating the shutter 4 comprises an electromagnet 34, an armature 35 and a lever 36 connected thereto and adapted to move rod 5 downward or upward, respectively, thereby turning shutter 4 as indicated in dotted lines.

The main switch U has three positions, that is a left hand, a right hand, and a middle position. Two springs 37 and 38 tend to push rod 39 with knob 40 into the middle position as indicated in the drawing. There is a locking device 41 operated by a solenoid 42 adapted to hold rod 39 in its left hand position until the automatic device S is operated by the relay R.

At M the electric motor driving the apparatus for moving the film is indicated.

The operation of the entire device is as follows:

When starting, knob 40 is pushed to the left closing the circuit to the driving motor M. Rod 39 is held in this left hand position because of the locking device 41, as explained above. The motor M causes movement of the film 1 which again drives the current interrupter Q. The current flows from B to the interrupter Q, and from there the interrupted current is lead to the resistance 31 and afterwards is distributed into two branches, one passing through magnet coil 24 and choking coil 32, the other one through magnet coil 25 and resistance 30 both back to A. Every rush of current coming from the interrupter causes the condenser 28 to be charged. During the period of interruption the condenser discharges over choking coil 32 and magnet coil 24 and also over resistance 30 and magnet coil 25.

Thus an alternating current is produced in the relay R and at the same time a spark on opening in the interrupter Q is avoided. On increase in revolutions of the motor M and speed of the film 1 the interrupter Q causes an increase in the frequency of the alternating current, which is equal to the frequency of the pictures on the film passing the projecting window. Consequently the resistance value in the choking coil 32 increases also in dependency of the frequency of the alternating current whereas the resistance value of resistance 30 does not change. (The resistance values against direct current both of choking coil 32 and resistance 30 are equal.) Therefore, the magnetic field of electromagnet 24 becomes constantly weaker as compared with that of electromagnet 25. Finally, at a certain frequency which can be predetermined by means of resistance 29, double-lever armature 26 turns into its other end position in which its right hand lever is horizontal, and thus contact is caused in the mercury contact tube 27. Thereby automatic switch device S is operated and the different contacts thereof are connected. Connection of contacts 44 and 45 causes the solenoid 42 to unlock the locking device 41 so that rod 39 returns to its middle position due to spring 38. At the same time connection of contacts 46 and 47 creates a current to flow through electromagnet 3 causing the shutter 4 to be opened.

This condition in the entire apparatus prevails as long as the frequency of the pictures passing the projecting window exceeds the predetermined frequency. As soon as this frequency is under passed the armature 26 turns back to its first end position in which the mercury contact tube 27 breaks the circuit to the automatic switch device S, so that contacts 46 and 47 are disconnected which causes armature 35 to return to the position in which shutter 4 is closed. And also because of disconnection of contacts 44 and 45 the motor M stops.

In cases in which it is considered desirable to stop the apparatus at will knob 40 is drawn to the right thereby causing a circuit which excludes coil 25 from working so that spring 43 and coil 24 turn the armature 26 back to its position shown in the drawing which has the same effect as explained just before.

There may be more contacts provided in connection with automatic switch S as for example 48, 49 and 50, 51 adapted to control other circuits, for instance a sound lamp or the lighting of the theatre, etc.

I do not want to be limited to the details disclosed or shown in the drawing as many variations will occur to those skilled in the art.

What I claim is:

1. An electric device for automatically operating a fire protecting shutter in a motion picture film projector, comprising a current interrupter intermittently driven in dependency on the speed of the film, means for transforming said interrupted current into alternating current, an armature, a pair of electromagnets adapted to tilt said armature in opposite directions operated by said alternating current, a choke coil in the circuit of one of said magnets, an electromotive actuator for operating the fire protecting shutter, an electric circuit for said actuator, and a control switch in said circuit operating in dependency on said armature.

2. An electric device for automatically operating a fire protecting shutter in a motion picture film projector, comprising a current interrupter intermittently driven in dependency on the speed of the film, means for converting the interrupted current into alternating current, an armature, an electromagnet for tilting the armature in one direction, an electromagnetic means operating in dependency on variations in the alternating current frequency for tilting the armature in the other direction, an electromotive actuator for operating the fire protecting shutter, an electric circuit for said actuator, and a control switch in said circuit operating in dependency on said armature.

3. An electric device for automatically operating a fire protecting shutter in a motion picture film projector, comprising a current interrupter intermittently driven in dependency on the speed of the film, means for converting the interrupted current into alternating current, an armature, an electromagnet for tilting said armature in one direction, electromagnetic means operating in dependency on variations in the alternating current frequency and serving to delay tilting of the armature by the electromagnet until the current has reached a predetermined frequency, an electromotive actuator for operating the fire protecting shutter, an electric circuit for said actuator, and a control switch for closing said circuit becoming operative through tilting of the armature by the electromagnet.

4. An electric device for automatically operating a fire protecting shutter in a motion picture film projector, comprising a current interrupter intermittently driven in dependency on the speed of the film, means for converting the interrupted current into alternating current, an armature, a pair of electromagnets for tilting said armature in opposite directions and operated by the alternating current, means responsive to variations in the frequency of the current for causing one or the other magnets to selectively actuate the armature, an electromotive actuator for operating the fire protecting shutter, an electric circuit for said actuator, and a control switch in said circuit operating in dependency on said switch actuating means.

5. An electric device for automatically operating a fire protecting shutter in a motion picture film projector, comprising a current interrupter intermittently driven in dependency on the speed of the film, said interrupter including a shaft, a rotatable member adapted to be driven by the film for rotating the shaft, a switch closing member loosely mounted on the shaft for movement lengthwise thereof, means operative under intermittent rotation of the shaft for moving the switch closing member in opposite directions, a switch operated by said switch closing member, means for converting the interrupted current delivered by said switch into alternating current, switch actuating means operated by said alternating current, an electromotive actuator for operating the fire protecting shutter, an electric circuit for said actuator, and a control switch in said circuit operating in dependency on said switch actuating means.

6. An electric device for automatically operating a fire protecting shutter in a motion picture film projector, comprising a current interrupter intermittently driven in dependency on the speed of the film, said interrupter including a member rotating in dependency on the film speed, and a loose member, said rotating member having an inclined surface and said loose member having an opposing inclined surface, said opposing surfaces being adapted to cooperate with each other upon rotation of said rotating member to move the loose member in one direction, a spring adapted to move the loose member in the opposite direction upon stopping of the rotating member, a switch adapted to be closed and opened by the loose member in its opposite positions, means for transforming the interrupted current delivered by said switch into alternating current, switch actuating means operated by said alternating current, an electromotive actuator for operating the fire protecting shutter, an electric circuit for said actuator, and a control switch in said circuit operating in dependency on said switch actuating means.

7. An electric device for automatically operating a fire protecting shutter in a motion picture film projector, comprising a current interrupter intermittently driven in dependency on the speed of the film, means for transforming said interrupted current into alternating current, switch actuating means operated by said alternating current in dependency on the current frequency, an electric motor for driving the film, an electromotive actuator for operating the fire protecting shutter, control switches for said electric motor and electromotive actuator operating in dependency on said switch actuating means, and a master switch for said motor, said master switch being operative in one position to start the motor and in a second position to stop the motor, and having a third inoperative position, and a locking device for locking said master switch in its first position until the speed of the motor and the film has reached a predetermined level, and releasable thereafter to permit the switch to return to its inoperative third position.

8. An electric device for automatically operating a fire protecting shutter in a motion picture projector, comprising an electromotive actuator for operating the fire protecting shutter, an electric circuit for said actuator, an automatic control switch in said circuit, a second electric circuit connecting to a source of direct current, a current interrupter in said circuit intermittently driven in dependency on the speed of the film, a condenser shunting said circuit for converting the interrupted direct current from said interrupter to alternating current of a frequency determined by the speed of the film, an electromagnetic relay in said circuit receiving alternating current from the condenser, said relay operating in dependency on frequency changes of the alternating current to control the automatic switch and causing said switch to maintain the fire protecting shutter closed when the film speed is below a predetermined level.

9. An electric device for automatically operating a fire protecting shutter in a motion picture projector, comprising an electromotive actuator for operating the fire protecting shutter, an electric circuit for said actuator, an automatic control switch in said circuit, a second electric circuit connecting to a source of direct current, a current interrupter in said second circuit intermittently driven in dependency on the speed of the film together with means for converting the interrupted direct current into alternating current of a frequency varying with the film speed, electromagnetic means connecting with the second circuit operative to effect closing of the actuator control switch, and means operating in dependency on frequency changes of the alternating current in the second circuit with changes in the film speed to cause the actuator switch to be open except when the film speed exceeds a predetermined level.

PETER SEBASTIANI.